UNITED STATES PATENT OFFICE.

GEORGE M. RICE, 2D, AND ALFRED L. RICE, OF WORCESTER, MASSACHU-SETTS; SAID A. L. RICE ASSIGNOR TO SAID GEORGE M. RICE, 2D.

ART OF SEPARATING ANIMAL FIBERS FROM VEGETABLE FIBERS.

SPECIFICATION forming part of Letters Patent No. 239,622, dated April 5, 1881.

Application filed July 23, 1880. (No specimens.)

*To all whom it may concern:*

Be it known that we, GEORGE M. RICE, 2d, and ALFRED L. RICE, both of Worcester, in the county of Worcester and State of Massachusetts, have invented certain new and useful Improvements in the Art of Separating Animal Fibers from Vegetable Fibers; and we declare the following to be a description of our said invention, sufficiently full, clear, and exact to enable others skilled in the art to which it appertains to make and use the same.

The object of our invention is the separation of animal fibers from vegetable fibers by means of dry solid chemical agents.

In carrying out our invention we employ ordinary bleaching-powder, chloride of lime, or any chemical substance of a solid nature from which gaseous hydrochloric acid, chlorine, or chlorine compounds may be liberated by the action of heat, as hereinafter set forth.

The apparatus employed may be variously constructed. It consists of a suitable chamber or receiver of sufficient capacity for containing the mixed fibrous material or rags without closely compressing them, and capable of being closed, or nearly so, and arranged in such manner that the contents can be mechanically agitated and heated during treatment. A revolving metal cylinder arranged within an oven or furnace, and provided with a removable man-hole plate and air-blast connection, is a suitable form, although other kinds of apparatus could be used, if preferred.

The charge of rags or mixed fibrous material to be treated is, in ordinary dry condition, placed within the receiver, together with a quantity of ordinary dry bleaching-powder, chloride of lime, or other suitable dry solid chemical agent in pulverized or granulated form, which is thoroughly mixed (previous or subsequent to their insertion in the receiver) with the rags or fibrous material, and by revolution of the receiver or otherwise is distributed completely and uniformly throughout the mass. The receiver being closed, except the small air-inlet and escape-vent, its contents is subjected to the action of heat at sufficiently high degree—not exceeding 300° Fahrenheit—to liberate from the solid chemical substance a portion of the gaseous hydrochloric acid, chlorine gas, or gaseous chlorine compounds, which acts upon the material to disintegrate the vegetable fibers without evolving a sufficient quantity of such gas to destroy the animal fibers.

When sufficient action has transpired, the material can be subjected to an air-blast for removing the chemical fumes and vapors, and further destructive effect stopped by reduction of the temperature.

The amount of solid chemical substance required for a given quantity of rag stock depends considerably on the nature of the materials used and the relative proportions of animal and vegetable matter contained in the charge to be treated. It may be stated at about eight per cent., in weight, for ordinary mixed cotton and wool fabrics. It also depends somewhat on the facility with which the solid chemical substance liberates gaseous hydrochloric acid, chlorine, or chlorine compounds by the application of heat at the temperature employed.

After the fumes and vapors have been blown off, the material may be taken from the receiver and placed in a dusting-machine for removing the particles of solid chemicals and the disintegrated vegetable fibers, when the animal fibers will be left in a proper condition to be worked on the pickers or other machinery ordinarily employed for working such material.

We desire it to be understood that we do not herein make claim to such features of the art of separating animal fibers from vegetable fibers as are claimed in and secured to us by Letters Patent Nos. 205,139 and 235,170.

What we claim as of our invention, and desire to secure by Letters Patent, is—

1. In the art of separating animal fibers from vegetable fibers, the process of treating the mixed fibrous materials hereinbefore described, which consists in distributing throughout the mass of material, in granulated or pulverized form, a chemical substance of solid nature from which gaseous hydrochloric acid, chlorine, or chlorine compounds can be liberated, and the subsequent liberation of the said gaseous product in contact with the material by the elevation of temperature, as set forth.

2. The process of treating mixed fibers for separation, consisting in exposing the mixed fibrous material, in combination with a granulated solid chemical agent or agents, within a close receiver, to the action of heat at a temperature sufficient to liberate disintegrating gas or gases from said solid chemicals, as hereinbefore set forth.

3. The process of separating animal fibers from vegetable fibers, consisting in mixing with the mixed fibrous material dry bleaching-powder or chloride of lime, exposing the mass within a close receiver to the action of heat, and subsequently removing the chemical fumes and vapors by a blast of air passed through the receiver.

Witness our hands this 21st day of July, A. D. 1880.

GEO. M. RICE, 2D.
    ALFRED L. RICE.

Witnesses:
 CHAS. H. BURLEIGH,
 S. HAMILTON COE.